United States Patent

[11] 3,565,447

[72] Inventors: Joachim and Lucy Hans Peter Goetze, Rostock, Germany
[21] Appl. No.: 744,506
[22] Filed: July 12, 1968
[45] Patented: Feb. 23, 1971
[73] Assignee: Institut Fur Schiffbau Rostock, Germany
[32] Priority: Oct. 5, 1967
[33] Germany
[31] P1,531,751

[54] STERN TUBE SEAL
4 Claims, 2 Drawing Figs.

[52] U.S. Cl. .................................................. 277/59,
115/34; 308/36.1
[51] Int. Cl. ................................................. F16j 15/00
[50] Field of Search .......................................... 277/58, 59,
63, 65, 152, 153; 308/36.1, 161, 3.5; 115/.5, .5
(A), .5 (B), 34, 34 (A), 34 (B), 35

[56] References Cited
UNITED STATES PATENTS

| | | | |
|---|---|---|---|
| 2,912,264 | 11/1959 | Peck | 277/58X |
| 2,971,800 | 2/1961 | Ruthner | 308/36.1 |
| 3,199,318 | 8/1965 | Sullivan et al. | 308/36.1X |
| 3,320,007 | 5/1967 | Tennies et al. | 308/36.1 |
| 3,413,008 | 11/1968 | Greiner | 277/58 |

FOREIGN PATENTS

| | | | |
|---|---|---|---|
| 1,443,284 | 5/1966 | France | 277/58 |
| 883,985 | 7/1953 | Germany | 308/3.5 |

Primary Examiner—William F. O'Dea
Assistant Examiner—Robert I. Smith
Attorney—Cushman, Darby & Cushman ABSTRACT: A seal for the sea water end of oil-lubricated stern tubes. Relative axial movement between a bushing for a ship's propeller shaft and an annular seal surrounding the bushing is prevented by an axial slide bearing. The annular slide bearing includes a stop shoulder fixed to the bushing which is adapted to abut a complementary shoulder of the guide ring of the seal. A felt sealing element is located on each side of the bearing in order to prevent abrasion products generated by contact between the bushing and a plurality of shaft packing rings from entering the slide bearing. The foregoing abstract is not intended to define the scope of the invention and is only provided to permit a cursory review of the gist of the invention.

PATENTED FEB 23 1971 3,565,447

INVENTORS
JOACHIM LUCY
HANS PETER GOETZE

BY Cushman, Darby & Cushman
ATTORNEYS

STERN TUBE SEAL

BACKGROUND AND BRIEF DESCRIPTION OF THE INVENTION

This invention pertains to a seal for the sea water end of stern tubes with oil-lubrication.

It is important that stern tubes which are oil-lubricated be protected from the intrusion of sea water into the stern tube; it is equally important to prevent the leakage of oil from the stern tube. Ingress of sea water or the loss of oil will substantially impair the performance of the bearing between the tube and the propeller shaft of the ship.

The normal method of installing a seal of this general nature is to attach a bushing to the propeller shaft, and then mount or fix the seal on the bushing. The seal is also fastened to the stern tube in an appropriate manner. The basic problem to be solved is how to prevent axial shifting or relative longitudinal movement between the sealing body and the bushing which is secured to the shaft. If this relative shifting is not curtailed, the bushing will be abraded over a period of time with the consequent formation of a series of grooves or score lines in the bushing. This results in a substantial impairment of the integrity of the seal with a consequent seepage or flow of oil from the stern tube. On the other hand, these same score lines or grooves could become the vehicle for the passage of sea water into the stern tubes proper, with highly undesirable results.

There have been several prior attempts to solve the problem. In one prior stern tube seal, sliding metallic sealing surfaces which are arranged perpendicularly to the shaft axis are compressed against one another by springs or by oil pressure. One of the drawbacks of this arrangement is that there is a relatively meager amount of space in the axial direction for the insertion of this type of sea water seal, since the propeller boss should not be allowed to project too far into the stern tube. Accordingly, a seal of this nature must be carefully assembled in order to ensure satisfactory performance. However, this is virtually impossible since the final assembly can not take place in the work shop, but only upon actual installation of the seal at the slip, way or dock. Therefore, it is not possible to assemble the individual parts of the seal with enough precision to ensure satisfactory performance.

Another disadvantage of this seal is that it must be completely dismantled each time the propeller shaft is removed. A further drawback, especially where an extremely long shaft is present, is that temperature variations may cause an elongation of the propeller drive shaft amounting to 20 millimeters or more. Although the use of saponifiable oil for lubricating the bearing has been proposed to overcome this disadvantage, it has been discovered that this does not yield a substantial oil film since the oil forms an emulsion with the sea water. This allows metallic contact between the shaft and the bearing bushing which is, of course, undesirable.

Another conventional stern tube seal is based on the principle of radially pressing a non metallic sealing element against a bushing of considerable surface hardness. The bushing is fitted on the propeller shaft proper and is protected from corrosion. In a seal of this type the housing oil chamber and bushing form an integral structural element which is first preassembled and then installed in the stern tube, whether or not the shaft is present. The oil chamber is laterally bounded by elastic collars which are fixed with the outer peripheral edge on the housing. The inner peripheral edge of the sealing lips engage the bushing.

Due to the provision of considerable surface pressure together with relatively low sealing forces and the support which is rendered by the oil pressure, the sealing effect of this arrangement is initially effective. However, with the passage of time it has become discovered that sealing effectiveness is substantially lessened, even if the sealing lips as such remain unimpaired. This phenomenon is caused by the recurrence of axial displacements between the shaft and the stern tube during operation. Axial displacement adversely affects the sealing lips of the shaft packing rings from the standpoint of durability as well as actual functioning capability. Moreover, shaft packing rings of this type are functionally suitable only for the sealing of rotating elements. Thus, axial sliding movements necessarily diminish the effectiveness of the sealing lips and consequently decrease the reliability of the entire seal.

In addition, a relative axial or longitudinal shifting between the guide ring and the stern tube occurs; this shifting is related to the diving depth of the seal. Longitudinal shifting or movement is caused by the variation between the oil pressure in the stern tube and the external sea water pressure. Consequently, axial forces of several hundred kilograms may act on the guide rings and collars due to the variable liquid pressure, thus causing an axial displacement of the seal with respect to the stern tube.

Both of the aforementioned axial movements, that is, the relative shifting between the shaft and the stern tube, as well as the relative movement between the guide ring and the stern tube, cause relative shifting between the sealing body and the bushing. The last mentioned shifting causes an axially directed oil output at the sliding surface of the sealing lips. As long as the surface of the bushing is in satisfactory condition, this oil output is negligible. However, the passage of time inexorably causes abrasion of the surface of the bushing. Notwithstanding the fact that the seal lips themselves remain undamaged, grooves, or "running marks" of a depth of several tenths of a millimeter are formed on the bushing surface. During operation, abrasion occurs on the sliding surface between the bushing and the shaft packing rings. These grooves, together with axial displacements between the sealing lips and the bushing cause a pumping output effect which may result in substantial oil leakage. Moreover, damage to the sealing lips themselves is also possible.

The aforementioned abrasion of the bushing results in the formation of a plurality of what might be termed "abrasion products." In other words, many rather minute filings or scrapings are ground off during the frictional abrasion process. These abrasion products the slide space of the guide ring and cause a substantial abrasion on the white metal-coated inner surface of the guide ring which surrounds the bushing in a sliding fit relationship. The resulting widening of the play between the elements involved means that the guide ring can no longer adequately perform its function. Thus, substantial leakage may occur due to the strong deformation stresses placed upon the sealing lips.

It is apparent therefore, that prior attempts to solve the sealing problem caused by relative shifting have been less than fully successful. In order to effectively solve this problem, a seal must be able to cope with the two primary causes of the problem. First, the seal must prevent relative shifting between the shaft and the sealing member, between the sealing member and the tube, and between the shaft and the tube. Second, the possibility of abrasive particles entering the slide bearing space of the guide ring must be obviated.

The present invention effectively solves the problem of preventing axial shifting between the sealing body and the bushing which is secured to the shaft. This is attained by providing a stop shoulder between the complementary surfaces of the guide ring and bushing. The stop shoulder is L-shaped in cross section, is fixed to the bushing, and functions as an axial slide bearing to preclude relative movement between the guide ring and the bushing. Thus, no abrasive sliding movements can occur between the sealing lips of the guide ring and the bushing.

Moreover, the sealing lips of the packing rings are physically separated from the slide or bearing space by a pair of suitable sealing elements which are inserted between the slide space and the sealing lips of the packing rings. Since the contact between the packing rings and the adjacent bushing surface forms the basis for abrasion and the consequent abrasion products, the provision of the sealing elements ensures that these products will never reach the slide space. Furthermore, the deposition of the abrasion products on the surface of the seal in areas other than the bearing space is in no way detrimental to the effective functioning of the seal.

It is apparent therefore, that the presence of a stop shoulder between the bushing and guide ring obviates the possibility of relative shifting between the bushing and the sealing member. Accordingly, there is virtually no chance for the creation of abrasion grooves; thus the chances of leakage of oil or seepage of sea water occurring is minimal. Accordingly, minor abrasion which may occur between the sealing lips of the packing ring and the contiguous bushing surfaces is incapable of impairing the functioning of the seal because of the presence of the sealing elements between the points of abrasion and the axial slide bearing. Thus the seal of the present invention is able to completely solve the problem.

In addition to the advantages mentioned above, other advantages will become apparent in the more detailed description of the invention which follows. Reference will be made to the accompanying drawings in which:

FIG. 1 is a fragmentary cross-sectional view of the seal mounted on the bushing and secured to the stern tube; and FIG. 2 is an enlarged detailed view of the area of contact between the guide ring and the bushing of FIG. 1.

DETAILED DESCRIPTION OF THE INVENTION

Figure 1:
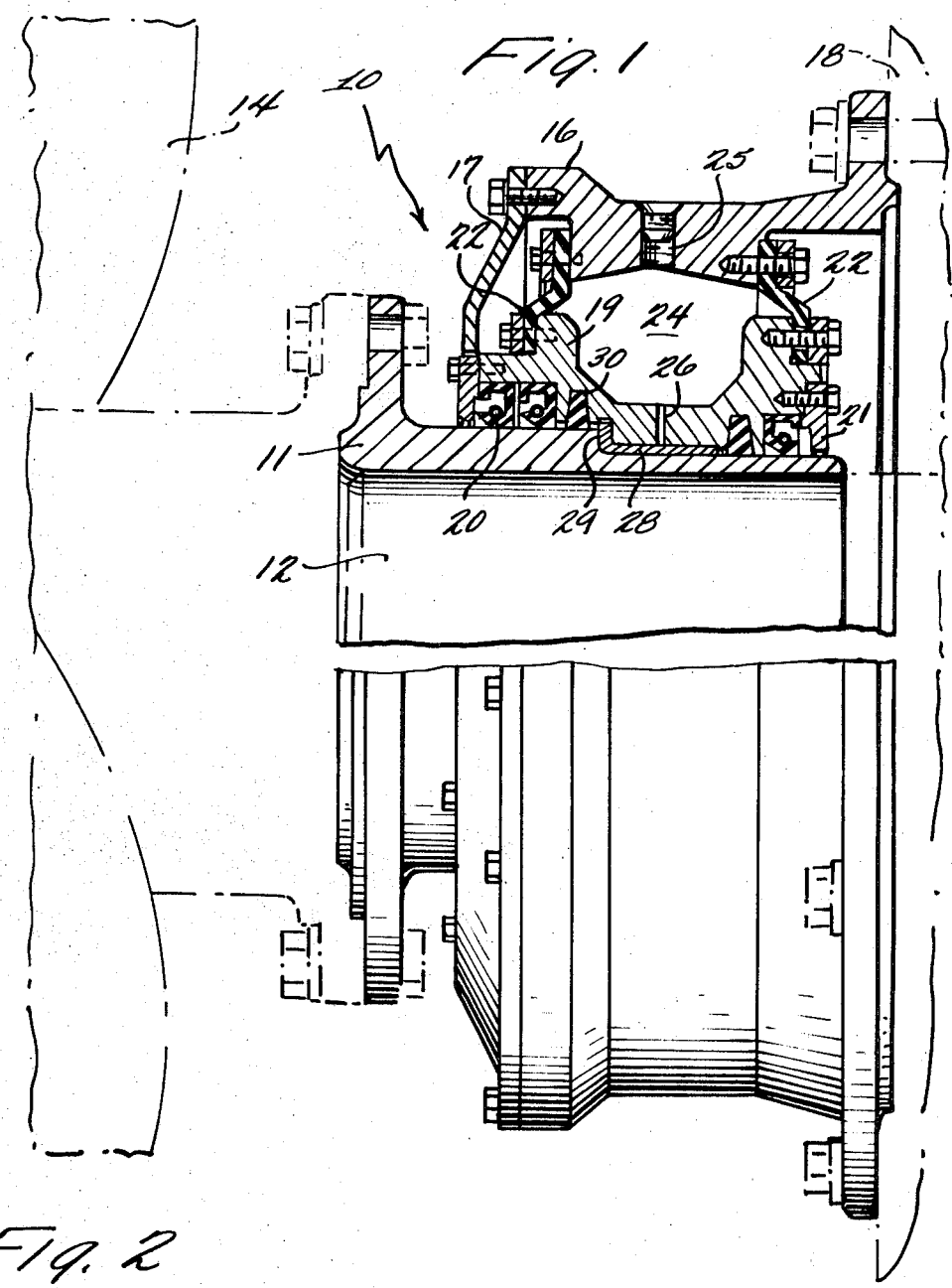
Figure 2:
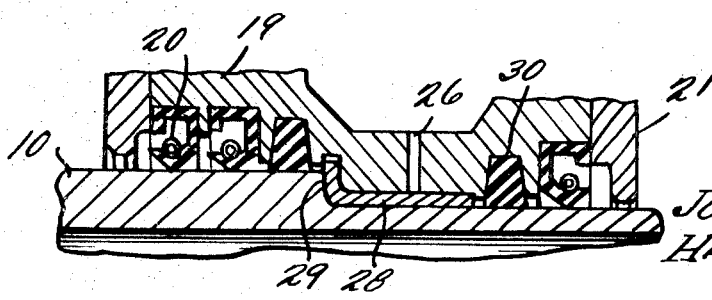

Referring to FIGS. 1 and 2 of the drawings, the inventive seal is generally indicated at 10. The seal, which is annular, is mounted on a stainless steel bushing 11. Bushing 11 is adapted to be drawn over propeller shaft 12, and is connected to the boss of propeller 14 by screws or the like. The seal 10 includes a housing 16. Housing 16 is secured to stern tube 18 by a suitable screw connection. Housing 16 is made from cast steel and surrounds an annular cast-steel guide ring 19. Guide ring 19 together with support ring 21 enclose a plurality of shaft packing rings 20. Each of the packing rings is composed of rubber, is spring loaded, and is of conventional construction. Packing rings 20 are supported by guide ring 19. The sealing effect is obtained by virtue of the pressure exerted by the packing rings 20 on the bushing 11. This is due to the resilient properties of the rings 20, as well as to the additional pressure on the sealing lips of rings 20 caused by static water and oil pressure.

The oil for the lubrication of the seal is found in oil chamber 24. Chamber 24 is also of annular construction, and is bounded on one end by housing 16, on each side by a conical elastic collar 22, and at the other end by guide ring 19. Collars 22 are shaped rubber parts having a generally conical form. Each of the collars serve to seal the oil chamber 24 and associated oil spaces from sea water. Additionally, the collars resiliently damp the radial and axial movements between the shaft and the stern tube. Oil chamber 24 is filled through an opening 25 in housing 16, after which the opening is plugged in a conventional manner.

Oil chamber 24 communicates by means of at least one port 26 of conventional construction with an annular axial slide bearing 28. Slide bearing 28 includes a right-angular stop shoulder 29 which is secured to bushing 11. Stop shoulder 29 is comprised of cast white metal.

As is apparent from an analysis of FIG. 2 of the drawings, stop shoulder 29 prevents relative axial movement between the guide ring 19 and the bushing 11. As mentioned previously, radial movement between the guide ring and bushing are prevented by elastic collars 22. Additionally, relative shifting resulting from different diving depths of the ship is also prevented by the stop shoulder 29. Thus no axial sliding movements can occur at the sealing lips, and the sealing effect of the stern tube seal remains unimpaired. Furthermore, since there is no relative movement of the sealing lips, there will be no running marks or grooves in the bushing 11. Therefore, there will be no oil leakage due to the pumping effect caused by the parts which would normally move relative to one another.

A pair of felt seals 30, of trapezoidal cross section are inserted within appropriate grooves in guide ring 19 between the sealing rings 20 and the axial bearing 28. Felt seals 30 prevent any minor abrasion particles formed on the bushing from entering the slide bearing. Thus, excessive abrasion in slide bearing 28 is prevented and the accurate centering of sealing lips 20 on bushing 11 is ensured.

The seal is mounted in a ship in assembled condition. Bushing 11 is secured to the propeller boss and housing 16 to stern tube 18. In addition, collars 22 are secured to housing 16, as well as to guide ring 19 by suitable screw connections. Guide ring 19 is in turn secure to support ring 21 in similar fashion. Housing 16 is also connected to plate cover 17 by an appropriate screw connection.

Although the stern tube seal has been described with reference to a particular embodiment, it will become apparent to those skilled in the art that variations can be made in the stern tube seal. All such variations as would be obvious to those skilled in this art are intended to be included within the scope of this invention.

I claim:

1. A seal for the sea water end of stern tubes with oil lubrication comprising:
   a housing having an oil chamber for lubricating said seal;
   a bushing positioned within a guide ring in said housing, said bushing adapted to be drawn over a ship's propeller shaft;
   a plurality of packing rings abutting said bushing for the purpose of preventing the entrance of sea water into the stern tube and the leakage of oil from said stern tube;
   an elastic collar for connection between said guide ring and said stern tube for permitting axial and radial movement of said guide ring together with said bushing with respect said stern tube; and
   means for preventing relative axial movement between said bushing and said seal packing rings.

2. The seal of claim 1 in which said means for preventing relative axial movement includes a stop shoulder on said bushing, said stop shoulder adapted to abut a complementary shoulder of said guide ring such that said preventing means acts as an axial slide bearing.

3. The seal of claim 2 in which said packing rings are separated from said axial slide bearing by a pair of sealing elements, one which is positioned on one side of the axial slide bearing, the other sealing element being positioned on the other side of said axial slide bearing.

4. The seal of claim 3 in which said sealing elements are comprised of felt, and said elements have a trapezoidal cross section.